United States Patent [19]

Johnsen

[11] Patent Number: 5,331,238
[45] Date of Patent: Jul. 19, 1994

[54] APPARATUS FOR CONTAINMENT AND COOLING OF A CORE WITHIN A HOUSING

[75] Inventor: Tyrone A. Johnsen, Rockford, Ill.

[73] Assignee: Sundstrand Corporation, Rockford, Ill.

[21] Appl. No.: 24,590

[22] Filed: Mar. 1, 1993

[51] Int. Cl.$^5$ .............. H02K 9/18; H02K 9/19; H02K 9/22; H02K 1/12
[52] U.S. Cl. .............. 310/58; 310/54; 310/64; 310/216
[58] Field of Search .............. 310/58, 59, 54, 64, 310/65, 216, 217, 254, 258, 259, 85, 88

[56] References Cited

U.S. PATENT DOCUMENTS

| | | | |
|---|---|---|---|
| 1,152,683 | 9/1915 | Williamson | 310/258 |
| 1,449,577 | 3/1923 | Bergstrom et al. | 310/64 |
| 1,882,487 | 10/1932 | DuPont | 310/65 |
| 2,066,740 | 1/1937 | Ripsch | 310/57 |
| 2,096,111 | 10/1937 | Kozlowski | 310/64 |
| 2,735,950 | 2/1956 | Brown | 310/57 |
| 2,818,515 | 12/1957 | Dolenc | 310/57 |
| 3,060,335 | 10/1962 | Greenwald | 310/54 |
| 3,229,134 | 1/1966 | Rakula | 310/216 |
| 3,648,085 | 3/1972 | Fujii | 310/54 |
| 4,012,653 | 3/1977 | Shigeta et al. | 310/217 |
| 4,250,423 | 2/1981 | Linscott, Jr. | 310/64 |
| 4,517,479 | 5/1985 | Aleem et al. | 310/54 |
| 4,839,547 | 6/1989 | Lordo et al. | 310/60 A |
| 4,946,433 | 8/1990 | Gorodissky et al. | 494/15 |
| 5,173,629 | 12/1992 | Peters | 310/216 |
| 5,185,547 | 2/1993 | Carbonell et al. | 310/259 |
| 5,218,252 | 6/1993 | Iseman et al. | 310/64 |

FOREIGN PATENT DOCUMENTS

| | | | |
|---|---|---|---|
| 521948 | 10/1955 | Belgium | 310/64 |
| 0129839 | 6/1988 | Japan | 310/54 |
| 0193546 | 7/1990 | Japan | 310/54 |
| 112875 | 1/1945 | Sweden | 310/64 |
| 437176 | 2/1975 | U.S.S.R. | 310/64 |

Primary Examiner—Steven L. Stephan
Assistant Examiner—C. E. LaBalle
Attorney, Agent, or Firm—Marshall, O'Toole, Gerstein, Murray & Borun

[57] ABSTRACT

A core is retained within a housing, and a cooling fluid is supplied axially along an axis of the core between the housing and the core in order to cool the core. The core may have core laminations provided with cooling fins, and the core laminations may be rotated with respect to adjacent core laminations so that the cooling fins provide a cascaded cooling passage for the flow of the cooling fluid. A containment/growth sleeve may be inserted within, or around, the housing having a thermal growth rate which is intermediate the thermal growth rate of the housing and the thermal growth rate of the core in order to minimize deflection of the housing with respect to the core. Fluid conduits are provided in the housing which cooperate with the cascaded cooling passages.

16 Claims, 4 Drawing Sheets

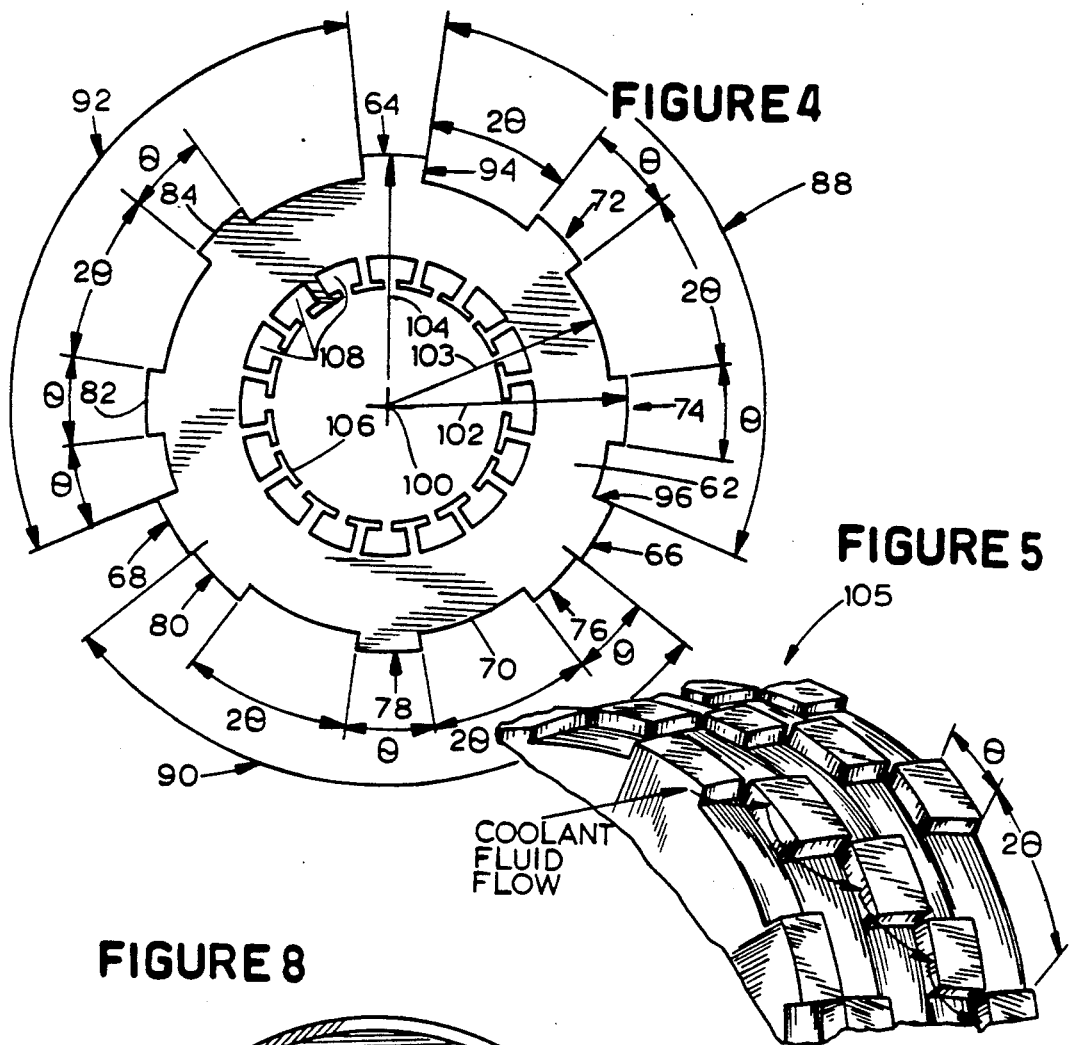
FIGURE 4
FIGURE 5
COOLANT FLUID FLOW
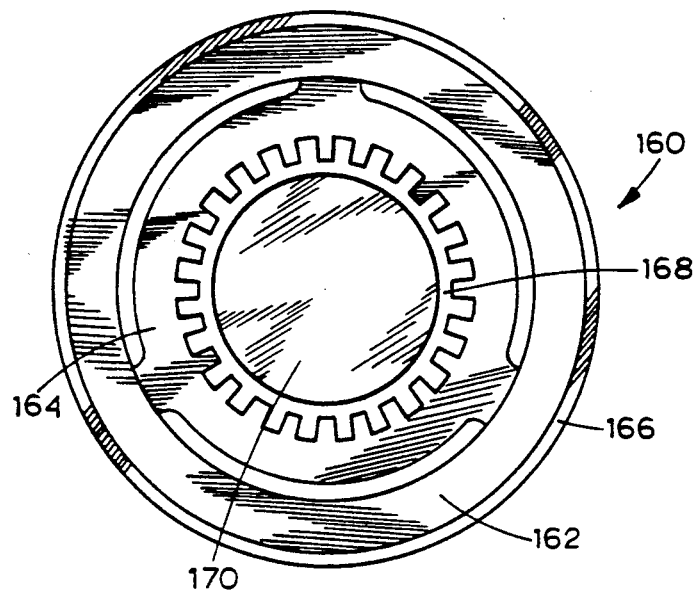
FIGURE 8

APPARATUS FOR CONTAINMENT AND COOLING OF A CORE WITHIN A HOUSING

FIELD OF THE INVENTION

The present invention relates to electromagnetic core assemblies which are used to provide electromagnetic flux paths in electromagnetic devices.

BACKGROUND OF THE INVENTION

Electromagnetic devices store energy in magnetic fields and recover that energy in order to convert an input of one form into an output of another form. For example, generators convert a mechanical input into an electrical output by using the mechanical input to rotate a magnetic rotor (or field) for storing the energy of the mechanical input in a varying electromagnetic field. A stator winding typically wound around the stator of the generator converts the variable electromagnetic field into electrical energy which is provided at the output of the generator.

A motor, on the other hand, uses an electrical input for storing energy in an electromagnetic field. The energy in that field is then converted by an armature into an output mechanical energy.

A transformer receives electrical energy at a primary winding in order to induce an electromagnetic field. This electromagnetic field is converted by a secondary winding back into electrical energy which is then provided at an output of the transformer. The output voltage (or current) of the transformer may be greater than, equal to, or less than the input electrical voltage (or current).

All of these electromagnetic devices generally incorporate a ferromagnetic core in order to provide a flux path for the electromagnetic fields generated by windings of electrically insulated, current carrying conductors. The core may be a single continuous core member or may be divided into one or more stator cores and one or more rotor cores. Furthermore, all of these cores are typically constructed of a plurality of laminations held or fastened together in a configuration designed to provide the desired flux path.

In designing electromagnetic devices such as generators, motors and transformers, the maximum output of these devices is limited by the maximum amount of heat which such devices can withstand. Such heat is principally produced by losses of the devices themselves. Such losses include copper losses generally referred to as $I^2R$ losses produced by the resistances of the current carrying conductors in the device, losses produced in slip rings and commutators, mechanical losses produced by brush and bearing friction, windage, and core losses produced by hysteresis and eddy current losses arising from changing flux densities in the iron of the cores of the devices. There may also be stray load losses which include the losses arising from nonuniform current distribution in the current carrying conductors and additional core losses produced in the iron of the core caused by the distortion of the magnetic flux by the load current.

Heat produced by such losses can unduly shorten the life of a machine. The operating temperature of an electromagnetic device is closely associated with its life expectancy because deterioration of the insulation of the current carrying conductors and of the core itself is a function of both time and temperature. Such deterioration is, at least in part, a chemical phenomenon involving slow oxidation and brittle hardening which leads to loss of mechanical durability and dielectric strength.

As a result, electromagnetic devices are often provided with some form of cooling in order to eliminate or reduce such deterioration.

The amount of cooling necessary for an electromagnetic device, in general, increases with increasing size of the device itself. Thus, while the surface area of the electromagnetic device from which heat can be carried away increases roughly as the square of the dimensions of the device, the heat developed by the above-noted losses is, on the other hand, roughly proportional to the volume of the device itself and, therefore, increases approximately as the cube of those dimensions.

In addition to being cooled, a core, particularly a stator, must be retained within a housing so that it remains fixed within the housing and so that the difference in thermal growth between the core and its housing does not damage the housing and/or core in the presence of heat. Also, for many applications, the housing of a stator must be sufficiently strong to act as a barrier for the containment of high energy rotor particles which may be produced by fragmentation of the rotor during rotor dynamic failure. For example, generators, which produce electrical power on aircraft, typically include a hollow stator surrounding a rotor. Because fragmentation of the rotor can be dangerous to the aircraft if the rotor particles, which result from a dynamic failure of the rotor, breach the housing of the generator, the housing of the generator must be made strong enough to prevent such breach.

The cross-section of a portion of a typical electromagnetic device 10 is shown in FIG. 1. The device 10 has a housing 12 and a core 14. The core 14, which may be a stator core, is attached to the housing 12 by a plurality of bolts 16. The core 14 is generally comprised of a plurality of concentric laminations all of which are stacked together and mounted within the housing 12 concentrically to an axis 18. The core 14 has an outer perimeter in the form of a circumference 20 and an inner perimeter in the form of a circumference 22. The circumference 22 forms a cylindrical void 24 into which may be mounted, for example, a rotor. The housing 12 has an inner perimeter 26. The outer perimeter 20 of the core 14 may be, if desired, substantially equal to the inner perimeter 26 of the housing 12. If the void 24 of the core 14 contains a rotor, the combination of the housing 12 and the stator core 14 should have sufficient strength to contain high energy rotor particles produced by a dynamic rotor failure (i.e. a failure of the rotor occurring during rotation of the rotor).

In some constructions, cooling passages can be provided in either the housing 12 or in a sleeve, such as an aluminum sleeve, between the housing 12 and the core 14. Cooling fluid is circulated through these cooling passages in order to draw heat away from the core 14. The bolts 16, which penetrate the housing 12 and the core 14, can cause undesirable leaks of cooling fluid if the bolts 16 should also penetrate the cooling passages. Moreover, the thermal growth rate of the housing 12, which is typically made of a magnesium alloy, is considerably different than the thermal growth rate of the core 14, which is typically constructed from laminations of magnetic iron. Thus, when losses in the electromagnetic device generate heat, deflection of the housing 12 as shown in FIG. 2 is produced. This deflection, if severe enough, can cause structural damage to the core 14 and/or housing 12. Furthermore, the additional stress at the points where the bolts 16 penetrate the housing 12 can facilitate an increase in leakage at those points. Also, if the combination of the housing 12 and the stator core 14 does not have sufficient strength, it will not contain high energy rotor particles produced by a dynamic rotor failure.

SUMMARY OF THE INVENTION

These problems are substantially alleviated or eliminated by the present invention.

Thus, according to one aspect of the invention, a core and housing assembly includes a housing, having an inner housing perimeter, and a core. The core provides an electromagnetic flux path and has an outer core perimeter with cooling fins projecting therefrom. A retaining means is provided to retain the core within the housing.

According to another aspect of the invention, a stator and housing assembly includes a housing means for housing a stator means. The housing means has an inner containment perimeter and housing fluid conduits. A stator means provides an electromagnetic flux path and is located within the housing means. The stator means has an axial length and is retained in a fixed position within the housing means. The stator means has cooling fins around an outer perimeter thereof wherein the cooling fins are arranged to provide axial cooling passages between the stator means and the housing means. The axial cooling passages are in fluid communication with the housing fluid conduits.

According to a further aspect of the invention, a method for cooling an electromagnetic stator contained within a housing includes the steps of (a) supplying a cooling fluid to a first housing fluid conduit formed within the housing, (b) conducting the cooling fluid through the first housing fluid conduit to the stator, (c) communicating the cooling fluid in the first housing fluid conduit to axial stator passages between the stator and the housing, (d) axially conducting the cooling fluid through axial stator passages in order to draw heat away from the stator, (e) communicating the cooling fluid in the axial stator passages to a second housing fluid conduit formed within the housing, (f) conducting the cooling fluid through the second housing fluid conduit, and (g) removing the cooling fluid from the second housing fluid conduit and from the housing.

According to a still further aspect of the invention, a core and housing assembly for electromagnetic devices includes a cylindrical housing having outer and inner housing perimeters, and a cylindrical stator core retained within the cylindrical housing. The cylindrical stator core is arranged to provide an electromagnetic flux path, and has outer and inner core perimeters. A rotor is retained within the inner core perimeter. A containment sleeve, having a perimeter which is substantially in contact with either the outer or the inner housing perimeters, has a strength greater than the housing and adds sufficient strength to contain rotor particles produced by a dynamic rotor failure.

According to yet a further aspect of the invention, an apparatus includes a housing having outer and inner housing perimeters, and an electromagnetic device retained within the inner housing perimeter. A containment sleeve, which is substantially in contact with either the outer or the inner housing perimeters, has a strength greater than the housing and has sufficient strength to contain high energy particles produced by a failure of the electromagnetic device.

BRIEF DESCRIPTION OF THE DRAWING

These and other features and advantages will become more apparent from a detailed consideration of the invention when taken in conjunction with the drawing in which:

FIG. 4 shows a core lamination according to the present invention;

FIG. 5 is a partial isometric view of a core constructed of core laminations such as the core lamination shown in FIG. 4;

DETAILED DESCRIPTION

Figure 1:
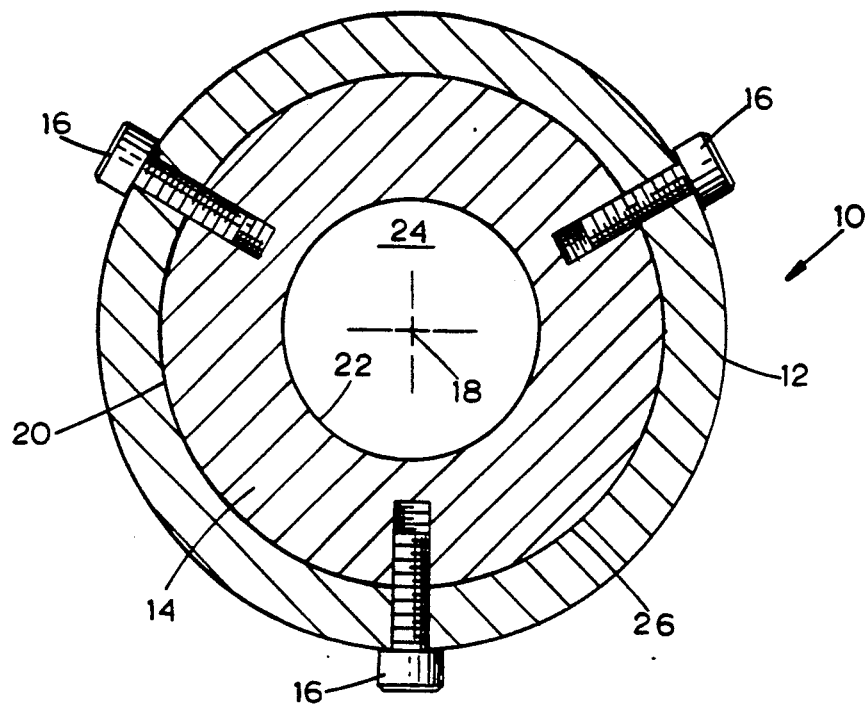
FIG. 1 is a cross-sectional view of a prior art core and housing assembly.
Figure 2:
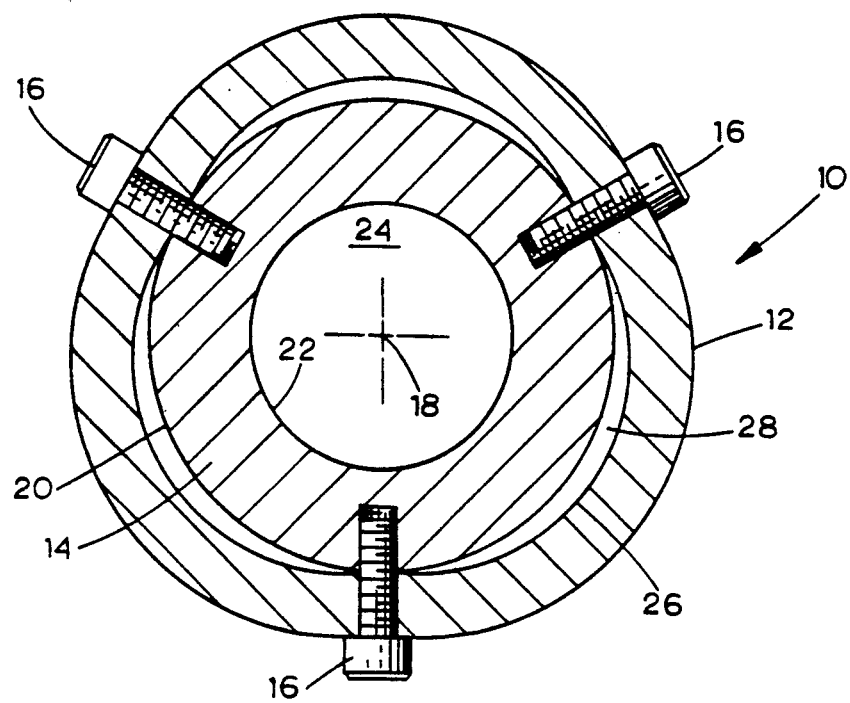
FIG. 2 is a cross-sectional view of the prior art assembly shown in FIG. 1 wherein the core and housing assembly is distorted by heat.
Figure 3A:
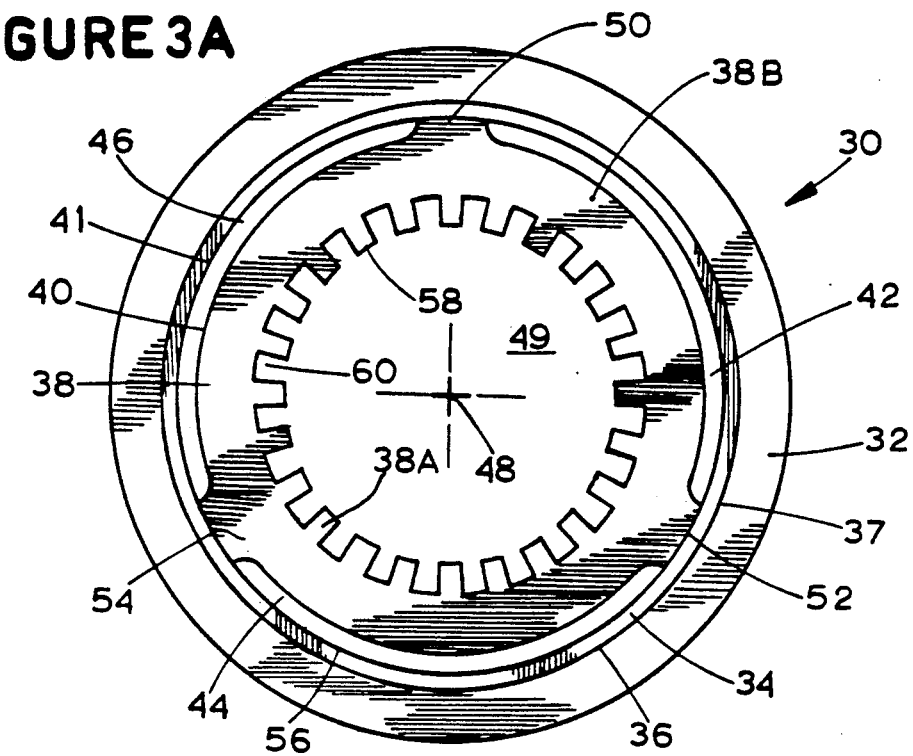
FIGS. 3A and 3B each show a partial cross-sectional end view of a core and housing assembly in which the core is retained in the housing by the use of positioning lugs.

As shown in FIG. 3A, a core and housing assembly 30 includes a housing 32 The housing 32 may have a cylindrical shape, although any desired geometric shape is possible. A containment/growth sleeve 34, which may also be cylindrical, is located within the housing 32 and has an outer circumference or perimeter 36 which is substantially commensurate with an inner perimeter or circumference 37 of the housing 32. Together, the housing 32 and the sleeve 34 may comprise a containment housing for containing an electromagnetic device.

A ferromagnetic core 38 is retained within the housing 32 by the containment/growth sleeve 34 and has an outer circumference or perimeter 40 which is somewhat smaller than an inner perimeter 41 of the containment/growth sleeve 34 in order to form passages 42, 44 and 46 which are parallel to a longitudinal axis 48 of the core and housing assembly 30. The core 38 may be the stator of a motor or generator and may have an interior hollow or void 49 within which a rotor of the motor or generator rotates.

The core 38 may comprise a plurality of laminations each having a plurality of positioning lugs 50, 52 and 54 preferably being three in number and preferably separated by 120° with respect to one another around the outer perimeter 40 of each lamination of the core 38. These positioning lugs 50, 52 and 54, the dimensions of which have been exaggerated in the drawing for ease of understanding, have sufficient dimensions that they abut the inner perimeter 41 of the containment/growth sleeve 34 in order to contain the core 38 in a stationary position within the housing 32 and the containment/growth sleeve 34. The positioning lugs 50, 52 and 54 separate the passages 42, 44 and 46 from one another.

The core 38 has an inner core perimeter 58 which defines the outer boundary of the interior hollow 49.

Around the inner core perimeter 58 of the core 38 are a plurality of slots 60 within which are wound windings, such as the windings of a stator. The core 38 is typically comprised of a portion 38A, within which the slots 60 are formed and are filled with electrical conductors, and a back-iron portion 38B, which both surrounds the portion 38A and provides a flux path for the flux produced by current flowing through the windings in the slots 60.

The housing 32 may typically be constructed of a magnesium alloy which is a low strength, high thermal growth rate material. The back-iron portion 38B of the core 38 consists of laminations of magnetic iron, which typically is a relatively high strength, low thermal growth rate material. In order to accommodate the differences between the thermal growth rates of the housing 32 and the core 38 so that the core 38 is retained in a fixed position relative to the housing 32 during the full temperature range to which the core and housing assembly 30 is subjected, the containment/growth sleeve 34, which may be fabricated from stainless steel, a composite material, or other material having high strength, has a medium thermal growth rate. Over the temperature range typically experienced by the core and housing assembly 30, the containment/growth sleeve 34 remains in contact with both the housing 32 and the core 38; thus, the core 38 is held in its fixed position within the housing 32 by continuous contact between the core 38 and the containment/growth sleeve 34 through the positioning lugs 50, 52 and 54.

Moreover, the high strength of the containment/growth sleeve 34 compensates for the low strength of the housing 32 should a dynamic failure of a rotor contained within the interior hollow 49 of the core 38 occur. That is, if such a rotor were to fail dynamically (i.e. while the rotor is rotating), the strength added by the containment/growth sleeve 34 inhibits breaching of the core and housing assembly 30 by high energy particles resulting from such dynamic failure of the rotor. This feature is particularly important because, as the number of rotor main field poles increases due to design requirements, the radial thickness of the back-iron portion 38B decreases and the energy absorption capability of the core 38 likewise decreases.

Figure 3B:
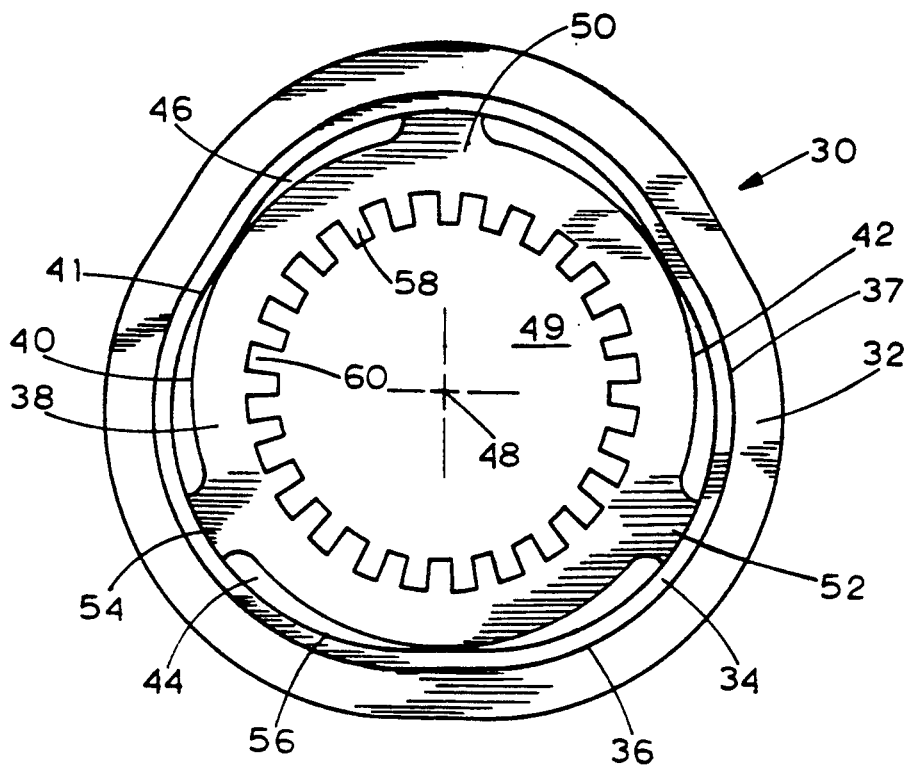

During assembly of the core and housing assembly 30, the housing 32 and the containment/growth sleeve 34 may be heated so that they expand. The core 38 can then be pressed into the containment/growth sleeve 34 so that the positioning lugs 50, 52 and 54 fit snugly against the inside diameter 41 of the containment/growth sleeve 34. The core and housing assembly 30 has the cross-sectional appearance shown in FIG. 3A at this time. As the assembly cools, any deflection of the housing 32 and the containment/growth sleeve 34 is accommodated by the passages 42, 44 and 46. Thus, during periods of low temperature, the housing 32 and the containment/growth sleeve 34 are allowed to deflect somewhat into the passages 42, 44 and 46 reducing the cross-sectional size of these passages, as shown in FIG. 3B, and maintaining the stress between the core 38 and the housing 32 within acceptable limits. The possibility of damage resulting from stress between the housing 32, containment/growth sleeve 34 combination and the core 38 is thereby minimized. During periods of high temperature, the housing 32 and the containment/growth sleeve 34 deflect to a round configuration increasing the cross-sectional size of these passages.

As will be more fully described in connection with FIGS. 6 and 7, cooling of the core and housing assembly 30 is accomplished by supplying cooling fluid to the assembly 30 so that this cooling fluid flows axially, i.e. parallel to the axis 48, through the passages 42, 44 and 46. That is, cooling fluid flows from one end of the core and housing assembly 30 (for example, from the top of the page as viewed in FIG. 3A) to its other end (into the page as viewed in FIG. 3A). By flowing the cooling fluid axially from one end of the core and housing assembly 30 to its other end, separation of the core laminations, which is often experienced when the cooling fluid enters radially through the housing in the middle of the core lamination stack and flows axially to each core end, is avoided.

Furthermore, the temperature dependent cross-sectional size of the passages 42, 44 and 46 results in a lower cooling fluid flow rate during periods of lower temperature and a higher cooling fluid flow rate during periods of higher temperature. That is, when the cross-sectional size of the passages 42, 44 and 46 is minimum at low temperatures, the resistance to flow is greatest and, therefore, less cooling fluid flows through the passages 42, 44 and 46. On the other hand, when the cross-sectional size of the passages 42, 44 and 46 is maximum at high temperatures, the resistance to flow is least and, therefore, more cooling fluid flows through the passages 42, 44 and 46. Thus, the maximum cross-sectional area of the coolant passageways at high temperatures facilitates maximum heat transfer from the core and housing assembly 30 to the cooling fluid and maximum cooling of the core and housing assembly 30.

This heat transfer can be further enhanced by the addition of small protrusions or fins. A core lamination having such cooling fins is shown in FIG. 4. As shown in FIG. 4, a lamination 62 comprises three positioning lugs 64, 66 and 68 all of which protrude from an outer diameter or perimeter 70 of the lamination 62. Also protruding from the outer diameter or perimeter 70 are a plurality of cooling fins 72, 74, 76, 78, 80, 82, and 84. Although seven cooling fins have been shown in FIG. 4, the lamination 62 may be provided with any desired number of cooling fins. Also, the cooling fins 72–84 should desirably be radially shorter than the positioning lugs 64, 66 and 68 in order to accommodate deflection of the containment/growth sleeve 34 into the gaps 42, 44 and 46 between the positioning lugs 64, 66 and 68 during periods of lower temperature. This deflection is similar to the deflection shown in FIG. 3B.

The positioning lugs 64, 66 and 68 have equal arcuate lengths and divide the perimeter 70 of the lamination 62 into three equal arcuate segments 88, 90 and 92. For example, the segment 88 begins with an edge 94 of the positioning lug 64 and ends with an edge 96 of the positioning lug 66. As shown in FIG. 4, each cooling fin has an arcuate length of $\theta$, and the arcuate distance between each two adjacent cooling fins is preferably $2\theta$, where $\theta$ may be any desired number of degrees. Additionally, each of the segments 88, 90 and 92 has a different cooling fin configuration. Thus, in the segment 90, the first cooling fin 76 abuts the positioning lug 66 whereas, in the segment 92, the first cooling fin 82 is separated from the positioning lug 68 by $\theta$ and, in the segment 88, the first cooling fin 72 is separated from the positioning lug 64 by $2\theta$. The second and subsequent cooling fins in each segment are separated from the corresponding preceding cooling fin by $2\theta$. The last cooling fin in a segment is separated from the positioning lug of the next subsequent segment by a distance which depends upon the value of θ and the arcuate length of the positioning lugs.

The dimensions of the positioning lugs and the cooling fins need not be exact, although it is preferable that, if the arcuate length of a cooling fin is θ, the arcuate distance between adjacent cooling fins is the number of positioning lugs minus one times θ. Thus, for the three positioning lugs 64, 66, and 68, the arcuate distance between adjacent cooling fins is three minus one, or two, times θ. Thus, with three positioning lugs, the arcuate distance between adjacent cooling fins is 2θ. With four positioning lugs, the arcuate distance between adjacent cooling fins is 3θ.

The cooling fins 72-84 should desirably be radially shorter than the positioning lugs 64, 66 and 68 in order to accommodate deflection of the containment/growth sleeve 34 into the gaps 42, 44 and 46 between the positioning lugs 64, 66 and 68 during periods of lower temperature, the positioning lugs 64, 66 and 68 may have a height of 0.03-0.04 of an inch while the cooling fins 72-84 may have a height of 0.02-0.03 of an inch. The heights of a positioning lug and of a cooling fin may be seen by reference to FIG. 4. If the lamination 62 has an axis 100 and a radius 102 between the axis 100 and the outer edge of a cooling fin, the height of a cooling fin is the difference between the radius 102 and a radius 103 from the axis 100 to the perimeter 70. Similarly, if the lamination 62 has a radius 104 between the axis 100 and the outer edge of a positioning lug, the height of a positioning lug is the difference between the radius 104 and the radius 103. The difference in heights between a positioning lug and a cooling fin should be sufficient to accommodate temperature related deflection of the housing 32 and/or the containment/growth sleeve 34 and is dependent upon the diameter of the core, the temperature extremes, and the materials chosen for the housing, the containment/growth sleeve, and the core.

Furthermore, the arcuate length of a positioning lug may be 15°-20°. If the radius 103 of the core lamination 62 is about 5.5-6 inches, the edge to edge width of a positioning lug as viewed in FIG. 4 is about 0.75-1.0 inch. If θ is about 1°, a cooling fin has an edge to edge width of about 0.04-0.05 of an inch for the same radius 103, and the distance between cooling fins is about 0.08-0.10 of an inch. With these dimensions, the side of a cooling fin (as viewed in FIG. 4) appears rectangular. Also, with these dimensions, about one hundred cooling fins may be provided around the lamination 62.

A core for an electromagnetic device is constructed by stacking together a plurality laminations, each lamination having the shape of the lamination 62 shown in FIG. 4. Thus, each core lamination in the core may be identical to all of the other laminations in the core. However, during assembly of the core, each core lamination having three positioning lugs is rotated clockwise by 120° with respect to the preceding lamination in the core. (Core laminations having four positioning lugs, for example, are rotated clockwise by 90° with respect to the preceding lamination in the core.) Thus, if the lug 64 is the starting point, the first lamination in the core may have a position as shown in FIG. 4. The second lamination is rotated clockwise by 120° with respect to the first lamination so that the lug 68 of the second lamination is axially ahead of the lug 64 of the first lamination, and the third lamination is rotated clockwise by 120° with respect to the second lamination so that the lug 66 of the third lamination is axially ahead of the lug 68 of the second lamination which is axially ahead of the lug 64 of the first lamination, and so on. (The laminations may, on the other hand, be rotated in the counter-clockwise direction as long as the direction of rotation is consistent as laminations are added to the core stack.)

A core 105, which results from this stacking procedure, has the appearance generally shown in FIG. 5. The cooling passages formed by the cooling fins 72-84 are cascaded cooling passages. That is, when cooling fluid is supplied along the outer perimeter of the core 105, the cooling fluid cascades over and against the cooling fins (as shown by the arrows) to enhance cooling of the core 105.

As shown in FIG. 4, an inner perimeter or circumference 106 of the core 62 is provided with a plurality of cooperating slots 108 which may receive windings of an electrically insulated, current carrying conductor as is well known in the art. The disposition of slots 108 around the inner perimeter 106 of each core lamination in the core 105 must cooperate with the disposition of the position lugs and the cooling fins around the outer perimeter 70 so that, as the core laminations are each rotated by 120° with respect to adjacent laminations to form the cascaded cooling fluid passages as shown in FIG. 5, the slots 108 of each lamination line up with the slots 108 of all other laminations to permit unobstructed paths for the winding of the stator coil. In the case of three 120° spaced positioning lugs 64, 66, and 68, the number of slots 108 must be a multiple of three.

Figure 6:
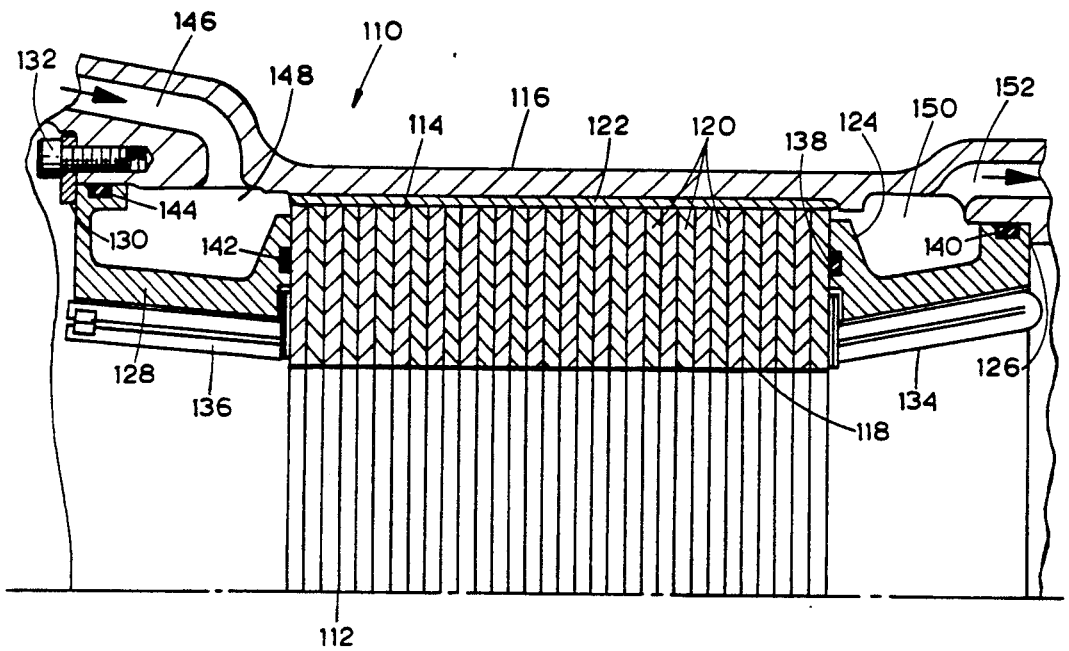
FIG. 6 is a partial cross-sectional side view of a core and housing assembly according to the present invention.

Supply of cooling fluid to a core of a core and housing assembly similar to the core and housing assembly 30 (FIG. 3A) is shown in more detail in FIG. 6. FIG. 6 shows a partial cross-sectional side view of a core and housing assembly 110 which is symmetric about an axis (i.e. center line) 112 (which is similar to the axis 48 of FIG. 3). A stator core 114 is located within a housing 116 of the core and housing assembly 110. If the core and housing assembly 110 contains a generator, for example, the rotor assembly (not shown) would be contained within an inner perimeter 118 of the stator core 114. The core 114 is comprised of a plurality of generally donut-shaped laminations 120 such as the lamination 62 shown in FIG. 4. Although position lugs and cooling fins are not shown in FIG. 6, each of the laminations 120 may be similar to the lamination 62, all of the laminations being arranged to form cascaded cooling passages as shown in FIG. 5. A cylindrical containment/growth sleeve 122 may be provided between the housing 116 and the core 114. At one end of the core and housing assembly 110 is an end seal 124 which butts up against a shelf 126 of the housing 116, and at another end is an end seal 128 which is retained by a washer 130 and a bolt 132. The end seals 124 and 128 may be constructed of a heat conducting material to act as a heat sink for end turns 134 and 136 of the current carrying conductors wound through conductor receiving slots such as the slots 108 of the lamination 62 (FIG. 4). The end seals 124 and 128 may be suitably bonded to respective ends of the core 114. As an example, 0-ring seals 138, 140, 142 and 144 are provided in order to form fluid tight seals between the end seals 124 and 128, the stator core 114, and the housing 116. Accordingly, the stator core 114 and the end seals 124 and 128 are wedged by the washer 130 against the shelf 126 and are retained thereby within the housing 116 and containment/growth sleeve 122 combination.

A fluid conduit 146 within the housing 116 supplies cooling fluid to a chamber 148 formed between the end seal 128 and the housing 116. Fluid in the chamber 148 then enters the cascaded cooling passages formed by cooling fins of the laminations 120 to flow between the core 114 and the housing 116 and containment/growth sleeve 122 combination in order to draw heat away from the stator core 114. This cooling fluid exits these cascaded passages into a chamber 150 formed between the end seal 124 and the housing 116. Cooling fluid is then returned from the chamber 150 through a fluid conduit 152 in the housing 116 so that the heat drawn away from the core 114 can be rejected, such as by a heat rejection apparatus 154 shown in FIG. 7, before the cooling fluid is returned to the fluid conduit 146.

Figure 7:
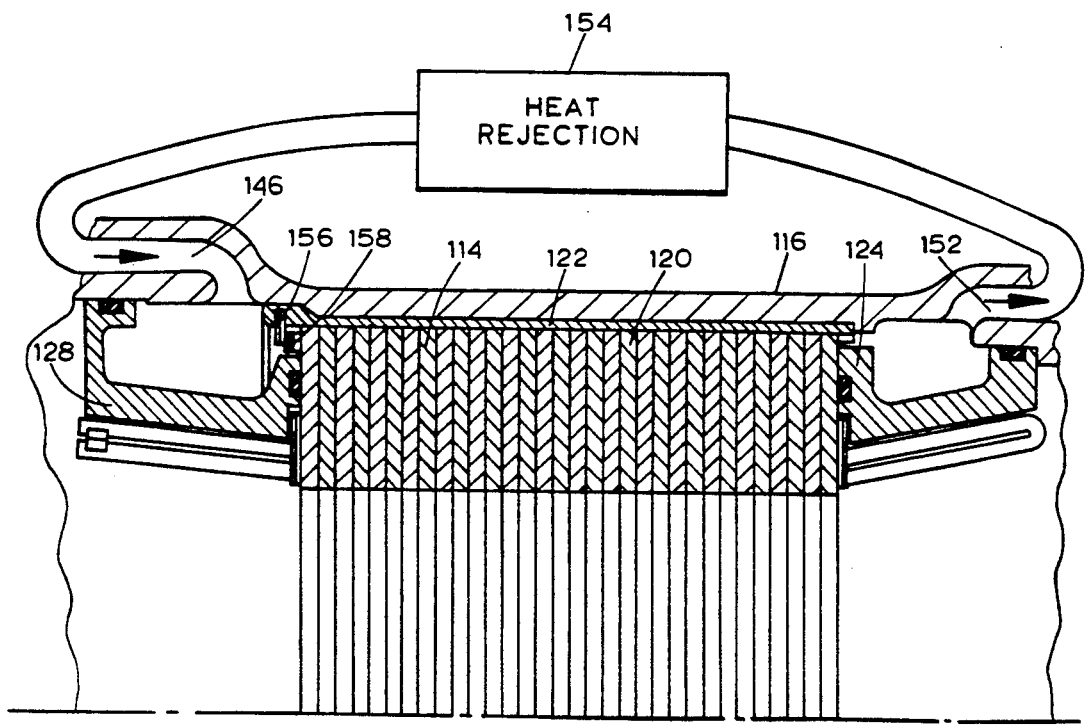
FIG. 7 is a partial cross-sectional side view of an alternative core and housing assembly according to the present invention; and, FIG. 8 is a partial cross-sectional end view of a core and housing assembly according to an alternative embodiment of the present invention.

FIG. 7 shows an arrangement similar to FIG. 6 except that a retaining ring 156 is pressed into a corresponding slot in the containment ring 122 with a wave washer 158 inserted between the retaining ring 156 and the core 114 so that the core 114 is axially retained within the containment/growth sleeve 122. In similar fashion, a retaining ring and a wave washer may be used in lieu of the bolt 132 and the washer 130 to axially retain the end seals 124 and 128 and the core 114 within the housing 116.

Shown in FIG. 8 is an alternative core and housing assembly 160 similar to the core and housing assembly 30 shown in FIG. 3A. The core and housing assembly 160 includes a housing 162 which houses a core 164 such as the core 38 shown in FIG. 3A. However, instead of a containment/growth sleeve 34 within the housing 32 as shown in FIG. 3A, the core and housing assembly 160 includes a containment/growth sleeve 166 around the exterior of the housing 162. The core 164 has an interior hollow 168 within which a rotor 170 rotates. The arrangement shown in FIG. 8 utilizes the housing 162 as an integral part of the containment structure to absorb the energy of high energy rotor particles produced by dynamic failure of the rotor 170 housed within the core 164. The containment/growth sleeve 166 has high tensile strength to limit thermal expansion of the housing 162 and to contain rotor dynamic failure. Also, the containment/growth sleeve 166 preferably has high elasticity for energy absorption and a coefficient of thermal expansion (CTE) between that of the core 164 and the housing 162.

As discussed above, each of the core laminations 62 of the core 105 may be provided with any desired number of fins. Moreover, it is convenient, but not necessary, that all core laminations be identical in geometry in order to reduce the need for a more extensive inventory of different laminations to be stacked together to form the core 105. That is, the cooling fin configuration around a core lamination may be varied from lamination to lamination and still result in cascaded passages. The position lugs arranged around each lamination may vary in number from two to as many as deemed necessary and may be replaced by alternative arrangements, such as bolts, rings or bands, for retaining the stator core within the housing. A containment/growth sleeve may be provided within a stator housing or around the stator housing. Various other modifications and adaptations may be made by those skilled in the art without departing from the scope and spirit of the invention as defined by the following claims.

I claim:

1. A core and housing assembly for electromagnetic devices comprising:

housing means for housing a core, the housing means having an inner housing perimeter;

a core for providing an electromagnetic flux path, the core comprising a plurality of core laminations and having an outer core perimeter and cooling fins projecting from the outer core perimeter, each core lamination having cooling fins arranged in a cooling fin configuration, the cooling fin configuration of each lamination being substantially similar to the cooling fin configurations of the other core laminations of the core, the cooling fins of each core lamination being arranged in a plurality of segments and wherein each segment of cooling fins of a core lamination has a different cooling fin configuration, each core lamination of the core being rotated with respect to adjacent core laminations to form cascaded cooling passages through which cooling fluid may cascade to cool the core, each of the cooling fins having a height above the outer core perimeter, the heights of the cooling fins being substantially the same; and, retaining means for retaining the core within the housing.

2. The assembly of claim 1 further comprising a winding having end turns, the end turns being isolated from, and being arranged to be cooled by, the cooling fluid.

3. The assembly of claim 2 wherein core has first and second ends and wherein the assembly further comprises end seals for sealing the first and second ends of the core so as to provide a sealed passage for cooling fluid to flow from one end of the core to the other end, the end turns abutting the end seals for cooling of the end turns.

4. The assembly of claim 1 wherein each core lamination of the core is rotated with respect to adjacent core laminations by a number of degrees dependent upon the number of segments of cooling fins.

5. The assembly of claim 1 wherein the core has a core thermal growth rate and wherein the assembly further comprises a containment/growth sleeve having an outer perimeter substantially equal to the inner housing perimeter, wherein the housing has a housing thermal growth rate which is higher than the core thermal growth rate, and wherein the containment/growth sleeve has a sleeve thermal growth rate intermediate the core thermal growth rate and the housing thermal growth rate.

6. A core and housing assembly for electromagnetic devices comprising:

housing means for housing a core, the housing means having an inner housing perimeter;

a core for providing an electromagnetic flux path, the core comprising a plurality of core laminations, each core lamination being rotated with respect to adjacent core laminations, the core having an outer core perimeter and cooling fins projecting from the outer core perimeter, each of the cooling fins having a height above the outer core perimeter, the heights of the cooling fins being substantially the same; and, positioning lugs projecting from the outer core perimeter, each positioning lug having a height substantially the same as each other positioning lug and substantially commensurate with the inner housing perimeter for retaining the core at a fixed position within the housing, the positioning lugs of each lamination being arranged to define a plurality of segments wherein each segment of a lamination contains a plurality of cooling fins arranged in a unique cooling fin configuration, each core lamination having the cooling fins and the positioning lugs arranged in a fin/lug configuration, the fin/lug configuration of each lamination being substantially similar to the fin/lug configurations of the other core laminations of the core, the rotation of the core laminations and the arrangement on the core between the positioning lugs of the cooling fins providing cascaded cooling passages through which cooling fluid may cascade to cool the core.

7. The assembly of claim 6 wherein each core lamination of the core is rotated with respect to adjacent core laminations by a number of degrees dependent upon the number of segments of cooling fins.

8. A stator and housing assembly for electromagnetic devices comprising:
housing means for housing a stator means, the housing means having an inner containment perimeter and having housing fluid conduits; and,
stator means for providing an electromagnetic flux path, the stator means being located within the housing means and having an axial length, the stator means comprising a core having a plurality of core laminations, each core lamination being rotated with respect to adjacent core laminations, the stator means having an outer stator perimeter and an inner stator perimeter, the stator means being retained in a fixed position within the housing means and having cooling fins around the outer stator perimeter thereof, each core lamination having cooling fins arranged in a cooling fin configuration, the cooling fin configuration of each lamination being substantially similar to the cooling fin configurations of the other core lamination of the core, the cooling fins of each core lamination being arranged in a plurality of segments wherein each segment of cooling fins of a core lamination has a different cooling fin configuration, the cooling fins being arranged to provide axial cooling passages between the stator means and the housing means, the axial cooling passages being in fluid communication with the housing fluid conduits, the cooling fins and the rotation of the core laminations together being arranged so as to provide cascaded cooling passages through which cooling fluid may cascade, the stator means having winding receiving slots along the inner stator perimeter, the winding receiving slots being arranged to receive a stator winding.

9. The assembly of claim 8 wherein each core lamination of the core is rotated with respect to adjacent core laminations by a number of degrees dependent upon the number of segments of cooling fins.

10. The assembly of claim 8 wherein the core comprises positioning lugs for retaining the core at a fixed position within the housing means, each of the positioning lugs having a positioning lug height, each of the cooling fins having a cooling fin height, the heights of the positioning lugs being substantially the same, the heights of the cooling fins being substantially the same and being less than the heights of the positioning lugs.

11. The assembly of claim 10 wherein the cooling fins are arranged on the core between the positioning lugs to provide cascaded cooling passages through which cooling fluid may cascade to cool the core.

12. The assembly of claim 11 wherein the core comprises a plurality of core laminations, each core lamination having the cooling fins and the positioning lugs arranged in a fin/lug configuration, the fin/lug configuration of each lamination being substantially similar to the fin/lug configurations of the other core laminations of the core.

13. The assembly of claim 12 wherein the positioning lugs of each lamination are arranged to define a plurality of segments and wherein each segment of a lamination contains a plurality if cooling fins arranged in a unique cooling fin configuration.

14. The assembly of claim 13 wherein each core lamination of the core is rotated with respect to adjacent core laminations by a number of degrees dependent upon the number of segments of cooling fins.

15. The assembly of claim 8 further comprising a winding having end turns, the end turns being isolated from, and being arranged to be cooled by, the cooling fluid.

16. The assembly of claim 15 wherein the stator means comprises a core having first and second ends and wherein the assembly further comprises end seals for sealing the first and second ends of the core so as to provide a sealed passage for cooling fluid to flow from one of the housing conduits, through the axial cooling passages, and to another of the housing fluid passages, the end turns abutting the end seals for cooling of the end turns.

* * * * *